Sept. 9, 1969      S. DONATH ET AL      3,465,847
INTERNAL COMBUSTION ENGINE OIL LUBRICATION SYSTEMS
Filed March 23, 1966      3 Sheets-Sheet 1

Inventors
Siegfried Donath
& Werner Gahler
BY Robert J. Outland
Attorney

Sept. 9, 1969    S. DONATH ET AL    3,465,847
INTERNAL COMBUSTION ENGINE OIL LUBRICATION SYSTEMS
Filed March 23, 1966    3 Sheets-Sheet 2

Inventors
Siegfried Donath
& Werner Gahler
BY Robert J. Outland
Attorney

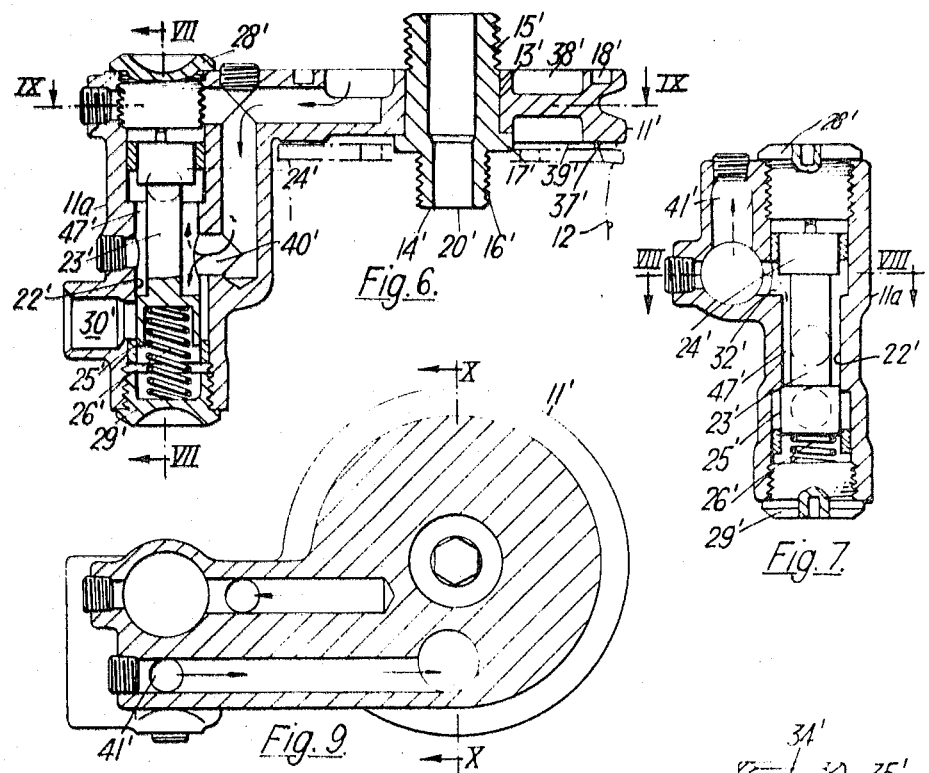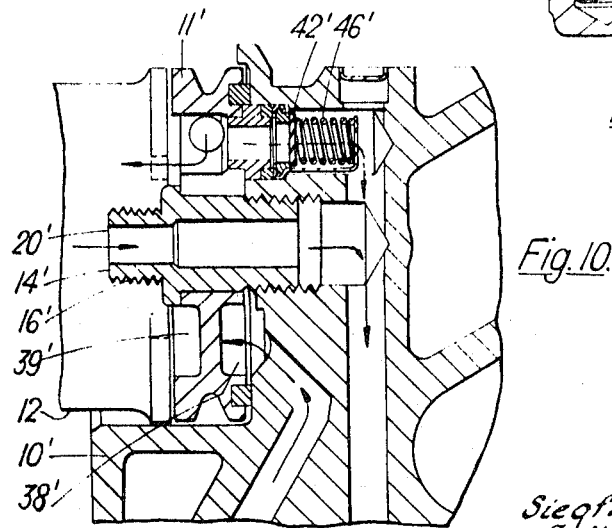

United States Patent Office 3,465,847
Patented Sept. 9, 1969

3,465,847
INTERNAL COMBUSTION ENGINE OIL LUBRICATION SYSTEMS
Siegfried Donath, Frankfurt am Main, and Werner Gahler, Russelsheim, Germany, assignors to General Motors Corporation, Detroit, Mich., a corporation of Delaware
Filed Mar. 23, 1966, Ser. No. 536,712
Claims priority, application Germany, Apr. 10, 1965, O 10,784
Int. Cl. F01m 1/02; F16n 13/22
U.S. Cl. 184—6                                    3 Claims

ABSTRACT OF THE DISCLOSURE

An internal combustion engine lubrication system has a distributor and connector member supporting a replaceable oil filter and including internal passages connecting with the filter and an oil cooler. A plurality of control devices within the distributor and connector member control oil flow to the oil cooler and filter and provide for shutting off oil pressure to the cooler when the engine is cold as well as bypassing oil around a plugged filter. Alternative embodiments provide various locations for the control devices.

---

This invention relates to internal combustion engine oil lubrication systems which include an oil cooler and an interchangeable oil filter, and in particular to systems of this kind intended for use in motor vehicles.

In known oil lubrication systems of this kind, the following primary components are commonly connected together; an oil pump mounted inside the engine casing, an interchangeable filter screwed on to the engine casing from outside by means of a connecting piece, and an oil cooler located outside the engine.

Such systems may also include regulator and control devices, for example by-pass and non-return valves, as well as thermo-responsive valves for controlling the flow through the oil cooler in accordance with the oil temperature. In the known systems, these regulator and control devices are arranged within the engine or are connected through its outer wall in which inlet and outlet bores, as well as oil channels, are provided for this purpose.

The drawback of these known arrangements is the necessity for providing the engine with several connection points for the filter, regulator and control valves and the like. These connections require suitable bores and oil passages in the outer wall of the engine casing and need unnecessarily long pipe lines. Production of the engine casing is therefore expensive, while the lubricating oil system is not easy to trace or repair.

According to the invention, the regulator and control devices are arranged in a common housing which, together with the oil distributor and filter connections, forms a single constructional unit. Preferably, the housing has approximately the same external contour as the replaceable filter and is mounted coaxial with the filter by screwing it on, or attaching it to the engine casing from outside through a connector member.

With the smallest manufacturing expense therefore, this arrangement provides, for the regulator and control devices of the oil lubrication system, a combined housing which has a simple, approximately cylindrical form, contains all the essential distribution channels and passages and serves as a connecting piece joining the filter to the engine.

The flow path of the lubricating oil inside and outside the engine is considerably simplified, the number of through-flow passages diminished, and the production costs for the engine casing are reduced.

In order to protect the oil cooler from the excessive pressure of the low-temperature oil when the engine starts up from cold, the common housing is provided with a shut-off member which keeps the cold oil away from the cooler.

When there is very little space between the engine casing and the wheel housing, for example with V-engines, lack of room often makes it impossible to accommodate a housing for the regulator and control devices between the interchange filter and the engine. In such cases, in accordance with the invention, the housing for the regulator and control devices is combined with the distributor and connector member, to constitute a constructional unit in such a way that the latter, formed as a flat space-saving disc with substantially the same outer contour as the oil filter, is mounted coaxially therewith by screwing it on to the engine casing by means of a connector socket, while the housing for the regulator devices is arranged as a lateral extension of the distributor and connector member, in a position parallel to the axis of the oil filter.

According to a further feature of the invention, the oil filter is arranged after the oil cooler in the direction of the oil stream.

Further features of the invention will be apparent from the description and claims.

Embodiments of the invention are illustrated in the accompanying drawings, in which:

FIGURE 6 is a longitudinal section through a different embodiment of a regulating and control housing;

FIGURE 7 is a section on line VII—VII of FIGURE 6;

FIGURE 8 is a section on line VIII—VIII of FIGURE 7;

FIGURE 9 is a section on line IX—IX of FIGURE 6; and

FIGURE 10 is a section on line X—X of FIGURE 9.

Figure 5:
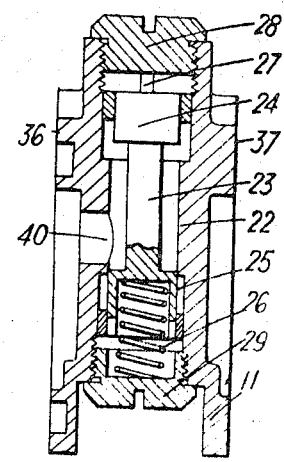
FIGURE 5 is a section on line V—V of FIGURE 3.

In the figures, like reference numerals refer to like elements. In the alternative embodiment of FIGURES 6 through 10, primed reference numerals are used to refer to elements having the same function as like numbered elements of FIGURES 3 through 5. The direction of oil flow is indicated in the figures by arrows.

Figure 1:
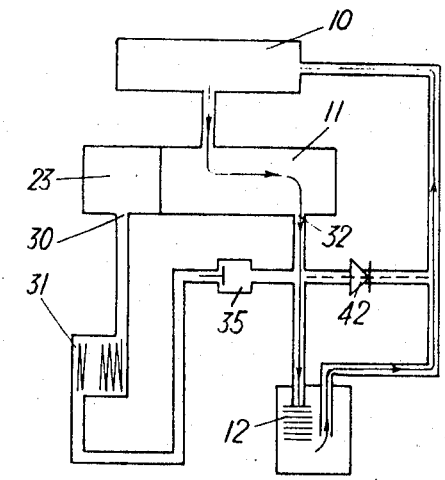
FIGURE 1 is a diagrammatic illustration of an arrangement according to the invention, showing the flow path of the lubricating oil when the oil is cold.
Figure 2:
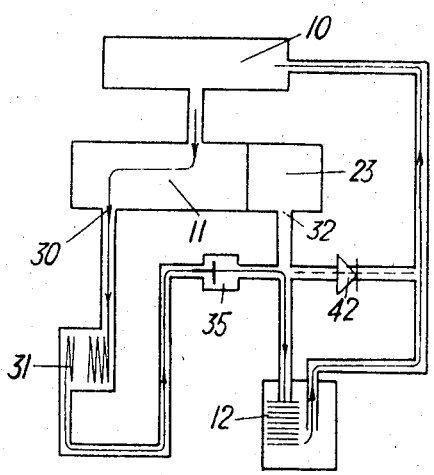
FIGURE 2 is a diagrammatic illustration of an arrangement according to the invention, showing the flow path of the lubricating oil when the oil is warm.

In the diagram of FIGURES 1 and 2, the individual regulating devices—which according to the invention are accommodated in a common housing—are shown spatially separated from each other.

Whether the engine is cold or hot, the lubricating oil passes out of the engine casing 10 into the connecting piece and housing 11 of a thermostatically controlled valve spool 23 (FIGURES 1 and 2).

When the lubricating oil is cold, the valve spool 23 shuts off the oil outlet 30 to the oil cooler 31, but leaves free a through-flow passage 32 to a filter 12. A non-return valve 35 serves as a shut-off member and keeps the oil away from the outlet of the cooler 31. The cold lubricating oil flows in the direction of the arrow (FIGURE 1) through filter 12 back into the engine casing 10. If the filter is clogged, the return is effected by way of a relief valve 42. When the oil becomes warm, valve spool 23 opens the outlet 30 leading to the oil cooler 31 and at the same time blocks the direct passage 32 to filter 12. The cooled lubricating oil now flows in the direction of the arrow, through the one-way valve 35, by way of filter 12 or relief valve 42 as the case may be, and back into the engine casing 10. The common housing for the regulating and control devices of the lubrication oil circuit is a light metal disc 11 (FIGURES 3–5) of substantially cylindrical shape, which contains all the necessary distribution channels and through-flow passages and has an outer contour similar to that of the replaceable filter 12. Further, disc 11 is provided with a central bore 13 for a connector 14 and with several radial and lateral bores.

The connector 14 is a hollow, threaded screw-in socket having two threads 15, 16 and a hexagonal collar 17 by which the housing 11 can be secured to a mount face. By means of this connector 14, the disc 11 is screwed on to the engine casing 10 and is sealed off with a gasket placed in an annular groove 18.

Filter 12 is secured on to thread 16 of the connector. A centrally placed annular groove in the connector 14 forms, together with the wall of the central bore 13, an annular chamber 19 which is in communication with the inner bore 20 of the hollow connector through three radial holes 21 spaced from each other by 120°. A lateral continuous bore 22 contains the thermosttically operated valve spool 23 having two control pistons 24, 25. The upper piston 24 contains an expansible element which by means of a pin 27, thrusts against a fixed plug 28 secured in one end of the bore 22. A further fixed plug 29 is secured in the bore 22 at the other end thereof. Valve spool 23 is pressed by a spring 26 to assume the position indicated in FIGURE 3.

In this position, the oil outlet 30 to cooler 31 is closed, while the through-flow passage 32 is opened. Passage 32 is closed to the outside by a plug 33. The return line from cooler 31 opens into the oil inlet 34 which is separated from passage 32 by the one-way valve 35. The end faces 36, 37 of disc 11 are provided with annular channels 38, 39 which have different depths at their periphery for the purpose of saving weight. The engine-side annular channel 38 is connected with the filter-side annular channel 39 by way of through-flow passages 40, 41 which run vertically to the plane of the disc, and by way of the bore 22 and the passage 32 which are drilled laterally in the body of the disc. Passing from the filter-side annular channel 39 is a bore 43 closed by a relief valve 42. If the pressure rises in annular channel 39, valve 42 opens in opposition to the constraining force of spring 46 and thus connects this annular channel 39 with a radial bore 44 the outer end of which is sealed off by a plug 45. Bore 44 leads to the annular chamber 19 and, by way of holes 21, into the return bore 20 of the hollow connector 14.

In the embodiment according to FIGURES 6 to 10, the disc 11' is made as flat as possible and is provided with annular channels 38', 39' and with the annular groove 18' for a gasket. The housing for the regulating and control devices is constructed as a lateral appendage 11a of the flat disc 11' and forms a one-piece casting therewith. The threaded connector 14', which in this case is shorter, joins the component 11', 11a to the engine casing 10; filter 12 is screwed on to thread 16'.

By way of the through-flow passage 40', the engine-side annular channel 38' is connected with chamber 47' between the valve spool 23' and bore 22'. The thermostatically operated valve spool 23' with two control pistons 24', 25' regulates the oil outlet 30' to cooler 31 and also the through-flow passage 32', which is connected directly with passage 41' and thus with the annular channel 39'. The construction and mode of operation of the thermostat valve spool 23', the one-way valve 35' and relief valve 42' are the same as the corresponding valves of the first embodiment and do not therefore require further description.

The flow path of the lubricating oil in housing 11 for the regulating and control means 23, 35 and 42 is as follows:

Oil coming from the engine casing 10 under the pressure of the oil pump passes into the annular channel 38 of housing 11 (FIGURES 3–5) and flows from there through passage 40 into chamber 47 of valve spool 23 which is under the influence of compression spring 26.

Figure 3:
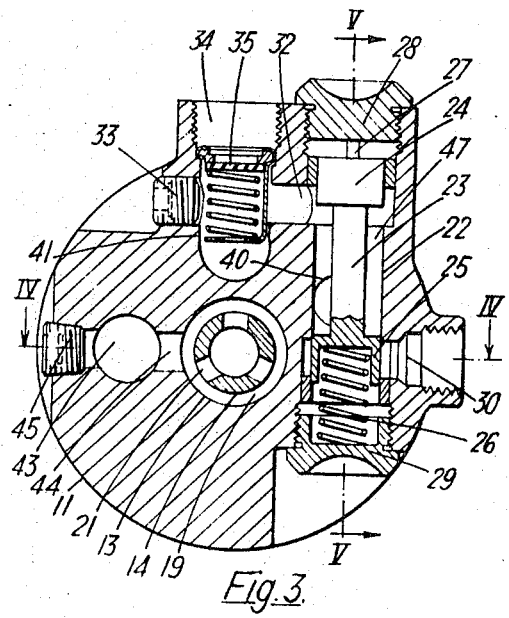
FIGURE 3 is a section through the housing for the regulating and control devices at right angles to the connection axis.
Figure 4:
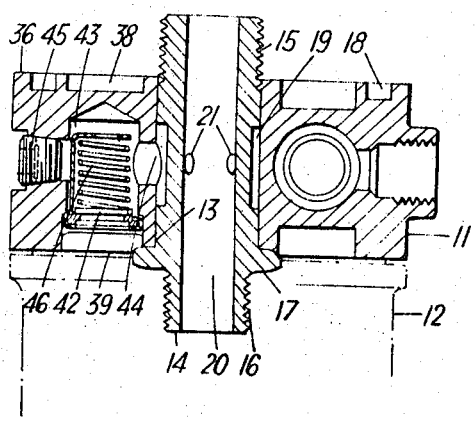
FIGURE 4 is a section on line IV—IV of FIGURE 3.

When the oil is cold, for example, during starting of the engine, the valve spool assumes the position indicated in FIGURES 3, 6 and 7 in which the oil outlet 30 to the oil cooler is closed. Oil then flows by way of passage 32 past the spring of the non-return valve 35, into passage 41 and thence into the annular channel 39 at the filter-side of housing 11.

A replaceable filter 12 is screwed tightly against side 37 of housing 11 by means of thread 16 of connector 14. The filtered oil flows through the hollow connector 14 back into the engine casing 10. If the filter is blocked, and the pressure in the annular channel 39 therefore rises above a certain value, valve 42 opens, oil fills the annular space 19, and passes through three radial holes 21 into the return bore 20 of connector 14.

As the oil warms up when the engine begins to run, the expansible material in piston 24 washed by heated oil, expands and presses valve spool 23 downwards. The oil outlet 30 opens slowly and a portion of the oil delivered passes through the cooler.

With increasing warming of the oil, the oil outlet 30 continues to open, and more and more oil flows through the cooler 31. When the oil becomes hot, the piston 24 shuts off the passage 32 completely, so that the entire oil flow goes through the cooler. The return line from cooler 31 discharges into oil inlet 34 which is separated from passage 32 by the one-way valve 35. The cooled oil coming from cooler 31 opens valve 35, and flows via passage 41 into the annular channel 39, whence it passes back into the engine casing 10.

In the embodiment shown in FIGURES 6 to 10, the regulating devices have been removed from the connecting piece, with the result that the latter can be reduced to a flat disc 11' having a contour corresponding with that of the oil filter 12.

Except for valve 42', located in the engine casing 10, the regulating devices are located in a housing 11a which is arranged as a lateral extension of disc 11' in an axially parallel position with respect to oil filter 12 and which is produced in one single casting integral with disc 11'. As described, this disc 11' is screwed onto the engine casing with the connector 14'. The replaceable filter 12 is screwed onto the thread of this connector 14'.

From the engine casing 10 the oil passes into the annular channel 38' and flows in the direction of the arrow through passage 40' into chamber 47' of the valve spool 23' which is under the influence of compression spring 26'.

The mode of operation of the thermostatically controlled valve spool 23' is the same as with spool 23 of the first embodiment.

When the oil is cold, the oil outlet 30' to cooler 31 is blocked by the lower valve piston 25'. The oil stream travels in the direction of the dotted arrow by way of the through-flow passage 32', past the spring of non-return valve 35' into passage 41' and passes from there into the annular channel 39' at the filter-side 37' of the disc 11'. The oil return by way of filter 12 into the engine casing 10 proceeds exactly as described above. When the filter is clogged, valve 42' opens and oil flows back into the engine casing 10.

When the oil is hot, the oil outlet 30' is free and the oil stream flows through cooler 31. The return line from cooler 31 discharges into the oil inlet 34'. The cooled lubricating oil opens the non-return valve 35' and rises through passage 41' into the annular channel 39'. From there, it passes, as explained above, through filter 12 and the central bore 20' in the connector 14', back into the engine casing 10.

We claim:
1. An internal combustion engine oil lubrication system including an oil cooler, a replaceable oil filter and a distributor and connector member through which oil is transferred between the engine casing and the oil cooler and filter, said member comprising:
   a unitary housing having internal passages connecting said engine casing with said cooler and said filter and
   a plurality of devices retained in said housing to control the flow of oil through the oil cooler and filter, said devices including temperature responsive valve means arranged to close off the inlet connection to the oil cooler under low oil temperatures and pressure responsive one-way valve means arranged in the outlet connection from the oil cooler to prevent oil flow to the cooler therethrough, whereby said temperature and pressure responsive valve means operate to prevent the delivery to the oil cooler of excessive oil pressures caused by low oil temperatures.

2. The system of claim 1 wherein said housing is of substantially the same external contour as the filter and is secured to the mounting face of the engine casing coaxially with the filter and said devices include a relief valve arranged to permit oil flow to bypass the filter when the pressure drop through the filter becomes excessive.

3. The system of claim 1 wherein said housing is formed as a unitary casting including a connector portion formed as a relatively thin disc having substantially the same external contour as the filter and being secured coaxially thereto and to a mounting face of the engine, said housing including a portion arranged laterally of said connector portion and in which said control devices are retained.

References Cited

UNITED STATES PATENTS

| | | | |
|---|---|---|---|
| 2,897,966 | 8/1959 | Humbert | 210—168 |
| 3,066,803 | 12/1962 | Seils | 210—168 |
| 2,068,394 | 1/1937 | Burckhalter et al. | 210—168 |
| 2,068,395 | 1/1937 | Burckhalter et al. | 210—168 X |
| 2,331,378 | 10/1943 | Dykeman. | |
| 3,023,846 | 3/1962 | Kolbe. | |

SAMUEL ROTHBERG, Primary Examiner

E. J. EARLS, Assistant Examiner

U.S. Cl. X.R.

184—104; 123—196; 210—168